United States Patent Office 2,813,963
Patented Nov. 19, 1957

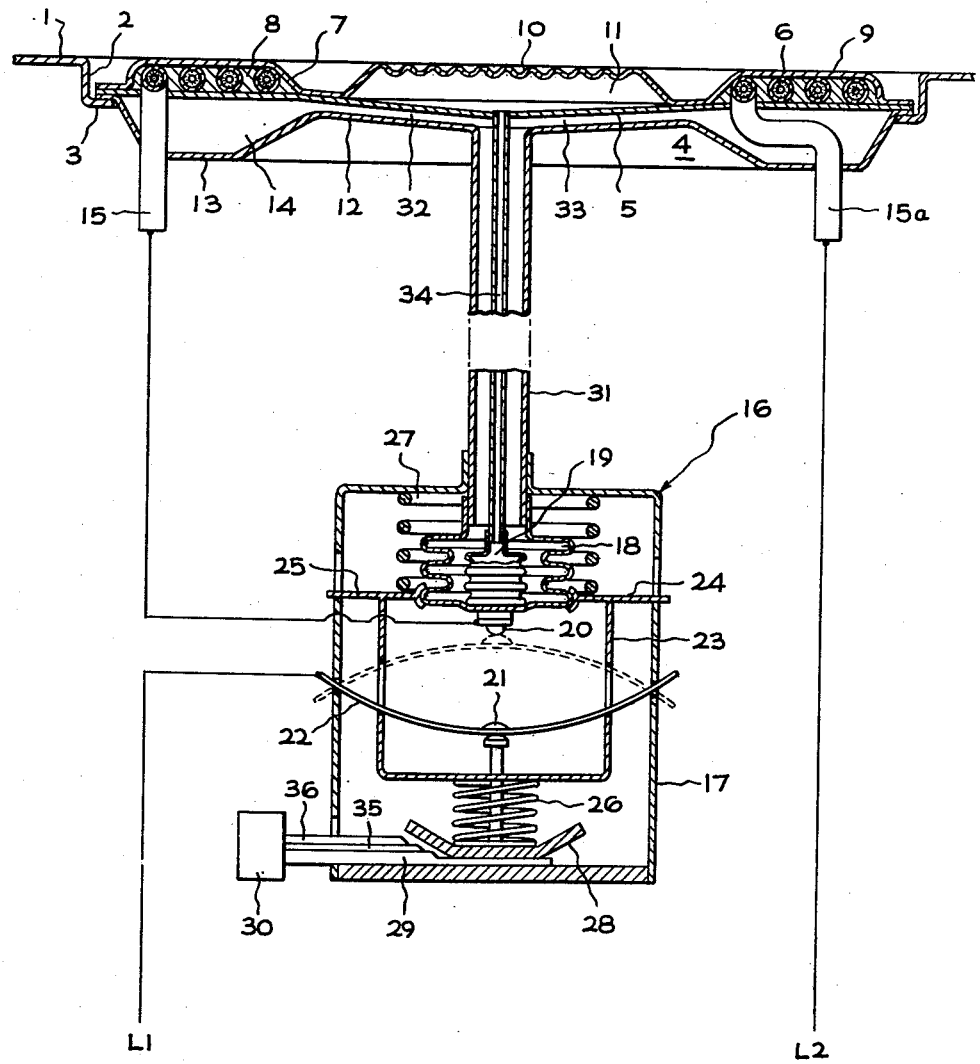

2,813,963
THERMOSTATICALLY CONTROLLED HEATING APPARATUS

Thomas H. Lennox, Redondo Beach, Calif., assignor to General Electric Company, a corporation of New York Application December 27, 1955, Serial No. 555,551

8 Claims. (Cl. 219—37)

This invention relates to thermostatically controlled heating apparatus, and more particularly to thermostatically controlled surface heating units of the type employed in cooking operations.

While there are now available several types of electric surface cooking units which are controlled in accordance with the temperature of a utensil heated thereby so as to maintain a desired cooking temperature, such units commonly include a separate temperature sensing device associated with a conventional surface heating unit, and are generally complex and relatively expensive. Also, the heating element incorporated in such units is not controlled by means directly and primarily responsive to its temperature, and its wattage rating must be limited to a value which may be maintained over long periods of time inasmuch as the control system does not limit the energization of the heating element in accordance with the rate of heat transfer from the element to the utensil or other article being heated thereby.

Accordingly, a principal object of the present invention is to provide automatic heating apparatus in which high wattage heating elements may be utilized so as to provide very rapid temperature controlled heating, and which is relatively inexpensive and simple in construction.

Another object of this invention is to provide thermostatically controlled cooking apparatus including temperature sensing means for sensing the temperature of the cooking utensil heated thereby and also the temperature of the element itself, whereby energization of the heating element may be controlled in accordance with both temperatures.

Another object of this invention is to provide a unitary heating unit including a temperature regulating system under the control of expansible fluid type temperature sensing elements in heat transfer relation with the cooking load and with the heating element itself, whereby a pressure sensitive thermostatic device may be utilized to control the heating element in accordance with pressure changes in the two fluid systems.

Further objects and advantages of this invention will become apparent as the following description proceeds, and the features of novelty which characterize the invention will be pointed out with particularity in the claims annexed to and forming a part of this specification.

Briefly stated, in accordance with one aspect of my invention, I achieve the foregoing objectives by providing a heating element adapted to support a cooking utensil or the like, temperature responsive means associated therewith adapted to sense the temperature of a utensil resting thereon, and a temperature sensing system in heat transfer relation with the heating element itself, both of the temperature responsive members including a chamber enclosing an expansible fluid so that the energization of the heating element may be regulated in accordance with changes in the pressures resulting from temperature changes in the utensil and in the heating element.

For a better understanding of my invention, reference may be made to the accompanying drawing in which the single figure is an elevation view, partially schematic and partly in section, of thermostatically controlled heating apparatus embodying my invention.

Referring to the drawing, the numeral 1 designates the top cooking surface of an electric range or the like having a generally circular opening therein defined by a downwardly bent flange 2 and an inclined lip 3 adapted to support an electric heating unit. It will, of course, be understood that cooking top 1 may form part of an electric range, or the top surface of a single unit hot plate or any other suitable device intended for surface heating use. Supported in cooking top 1 by means of lip 3 is an electric heating unit generally designated by the numeral 4. Heating unit 4 includes a generally flat circular base plate 5 made of relatively thin sheet metal, such as temperature resistance steel, for example, a sheathed electric heating element 6 coiled in flat spiral form and secured to plate 5, and a circular metal top plate 7 overlying base plate 5 and peripherally bonded thereto. Heating element 6 may be brazed to plate 5 and the heating unit's heat transfer properties may be improved by filling in the spaces between the coils of the heating element 6 with brazing metal as indicated by the numeral 8. Alternatively, heating element 6 may be initially brazed to top plate 7 in the same manner. Annular portion 9 of top plate 7 is, of course, adapted to support a cooking utensil or the like and hence should be flat and lie in a horizontal plane so as to insure good heat transfer between heating element 6 and the bottom of the utensil. Top plate 7 also includes a central raised wall portion 10 enclosing a fluid-tight chamber 11. Preferably, wall 10 is slightly corrugated so that it may engage the bottom of a utensil supported on annular portion 9 even though the bottom is not completely flat. However, only very limited movement of wall 10 is permissible inasmuch as appreciable changes in the volume of chamber 11 will change the calibration of the thermostatic control system disclosed herein. Central portion 10 and annular portion 9 may be separated by an annular section which is bonded to base plate 5 by means of a continuous circular brazed joint, for example.

Heating unit 4 also includes a circular metal bottom plate 12 peripherally bonded to base plate 5 and formed so as to include an annular depressed portion 13 enclosing an annular chamber 14 lying immediately below the coils of heating element 6. Preferably the peripheral edges of top plate 7, base plate 5, and bottom plate 12 are bonded together during a single brazing or welding operation. Because top plate 7 must possess both heat and abrasion resistance properties it should be formed of an alloy such as one of the well known nickel-chromium alloys adapted for high temperature use. Also, to provide good heat transfer between utensils resting on the heating unit and chamber 11, wall portion 10 should be relatively thin, of the order of .005 inch, for example. Bottom plate 12 is desirably formed of stainless steel so as to provide an inner reflecting surface which improves the heating efficiency of the heating unit. One suitable method of forming plates 5, 7, and 12 into an integral assembly includes the steps of securing the parts together temporarily and brazing the peripheral edge joint and also the annular joint between the inner and outer portions of top plate 7 in an atmosphere of hydrogen at a high temperature, such as 1025° C., for example. Also, to insure fluid tight joints around chamber 14 enclosed by annular portion 13 of bottom plate 12, the openings therein through which terminals 15 and 15a of heating element 6 extend may be similarly brazed to the heating element sheaths projecting through these openings.

From the description thus far, it will be seen that heating unit 1 includes a fluid tight chamber 11 enclosed by central raised wall portion 10 of top plate 7 and the central portion of base plate 5, and also an annular fluid tight chamber 14 enclosed by annular portion 13 of bottom plate 12 and the bottom annular portion of base plate 5. In accordance with the present invention these chambers are charged with a thermally expansive fluid and are adapted to be connected to a thermostatic device having separate expansible chambers which may be connected to utensil temperature sensing chamber 11 and heating element temperature sensing chamber 14. Thus heating unit 1 is so constructed that its energization may be controlled in accordance with changes in both utensil temperature and the temperature of its heating element.

The thermostatically controlled heating system of the present invention may include thermostatic switching means 16 including an outer case 17, an expansible contact actuating chamber 18, a second expansible contact actuating chamber 19, a movable contact 20 actuated by movement of chambers 18 and 19, and a cooperating contact 21 carried on an over center leaf spring 22 supported at its ends in openings formed in casing 17. The movable end of expansible chamber 18, which like expansible chamber 19, may be an expansible bellows as shown in the drawing, is secured to a rectangular contact actuator 23 provided with laterally extending arms 24 and 25 which cooperate with slots in casing 17 to limit movement of the actuator. Bellows 18 and 19 are opposed by a spring 26 which bears against the bottom surface of actuator 23 and are assisted by a coil spring 27 interposed between the top wall of casing 17 and the top surface of actuator 23. Spring 26 rests on a supporting collar 28 which in turn is positioned on a cam 29 actuated by a push button 30. It will be noted that leaf spring 22 is supported in oppositely disposed apertures in the side walls of casing 17 and extends through vertical slots formed in actuator 23, and that by depressing push button 30, spring collar 28 is cammed upwardly so as to apply force to spring 26 and thus shift contact actuator 23 upwardly so as to snap spring 21 over center and engage contacts 20 and 21.

As illustrated in the drawing bellows 18 is hydraulically connected to annular chamber 14 by means of a conduit 31 secured in fluid tight relationship to bottom plate 12 and communicating with radial passages 32 and 33 which extend outwardly along the bottom surface of base plate 5 between the upper end of conduit 31 and chamber 14. One or more radial passages connecting conduit 31 and chamber 14 may be utilized, or the entire central portion of bottom plate 12 may be spaced from the bottom surface of base plate 5 so as to provide uninterrupted communication between annular chamber 14 and the upper end of conduit 31. Bellows 19 is hydraulically connected to temperature sensing chamber 11 by means of conduit 34 preferably located concentrically within conduit 31 and secured in fluid tight relation at its upper end within an opening in the center of base plate 5. Thus it will be seen that two separate fluid filled hydraulic systems are provided, and that expansion of the fluid in either system will tend to shift movable contact downwardly, as viewed in the drawing, thus tending to de-energize heating element 6.

Any suitable thermally expansible fluid may be utilized in the hydraulic fluid filled systems of the present invention; however, because of the relatively high temperatures to which the fluids in the systems will be exposed, and in particular the fluid in annular chamber 14, a fluid such as argon gas is preferred. Preferably central chamber 11 is charged with argon gas under approximately one atmosphere of pressure at room temperature (e. g., 72° F.) while annular chamber 14 is charged with argon gas at a pressure below atmospheric pressure, for example, approximately 5 pounds per square inch absolute. With this arrangement, the pressure in central chamber 11 will increase to approximately 12 pounds per square inch gage at maximum load temperature of approximately 400° F., while the pressure in annular chamber 14 will increase to approximately atmospheric pressure when the unit is heated to its maximum temperature, which may be approximately 1,250° F., for example. It will be noted that by charging annular chamber 14 in the manner just described, the heating unit will fail safely because a leak in the system will increase the pressure within bellows 18 sufficiently to open contacts 20 and 21.

Referring briefly to the electrical control circuit of the present invention, it will be observed that heating element 6 is connected to a suitable power supply source indicated by line L1 and L2, and that contacts 20 and 21 are connected in series with heating element 6 so as to control the energization thereof. Furthermore, it will be observed that thermostatic control means 16 may be provided with additional cams, such as cams 35 and 36, actuated by separate push buttons, which permit the selection of various temperature levels to be maintained within a utensil heated by the heating unit. Because the cam surfaces of cams 29, 35 and 36 are arranged to apply various forces to spring 26, the temperatures at which contacts 20 and 21 open and close may be adjusted as desired.

While the details of thermostatic switch 16 forming a part of the presently preferred embodiment of this invention have been described in some detail, it will be understood that other suitable thermostatic control switch mechanisms actuated by a pair of expansible chambers associated in a tandem arrangement and actuated by hydraulic pressures in two separate systems, may be utilized.

Referring to the operation of the heating system described above, it will be noted that in the drawing the parts are shown in the "off" position. To operate the system, a utensil is first placed on the heating unit so as to be in thermal contact with annular portion 9 of the heating unit and also central wall portion 10. The heating unit is energized by pressing push button 30 (or one of the other push buttons) so as to cause the raised portion of the cam to support collar 28, thus applying an upward force to spring 26 sufficient to snap spring 22 over center, thus engaging contacts 20 and 21. Resistance heating element 6 is then energized and heat is supplied to the utensil. As the temperature of heating element 6 increases, the temperature of the fluid in annular chamber 14 also increases and tends to expand bellows 18 so as to open contacts 20 and 21 and de-energize the heater. However, so long as the cooking utensil is relatively cool most of the heat generated will be transferred thereto, and the first "on" cycle will be relatively long as compared with subsequent cycles as the utensil approaches the desired cooking temperature. Eventually the gas pressure in chamber 14 will increase sufficiently to cause contacts 20 and 21 to open, and thereafter the contacts will cycle between open and closed position in accordance with the combined pressures in bellows 18 and 19. As the temperature of the utensil and its contents increases, the fluid pressure in chamber 11 increases, causing bellows 19 to expand and to modify the on-off cycle established by the fluctuating pressure in bellows 18. As the desired cooking temperature is approached, bellows 19 functions to apply a modifying force sufficient to maintain the desired temperature within a relatively narrow temperature range. It will be observed that heating elements 6 will always be de-energized if the utensil is removed from the heating unit, because annular chamber 14 will be abnormally heated if the heat generated in the heating element is not transferred to a cooking load, and also in case the utensil suddenly begins to overheat, for example, when water is being heated and completely evaporates. In the latter case increasing pressure in chamber 11 will cause contacts 20 and 21 to open and de-energize heating element 6. Thus the heating unit is doubly protected against over-energization of the heating element which could result in the failure of the unit.

While I have shown and described a specific embodiment of my invention, I do not desire my invention to be limited to the particular construction shown and described, and I intend by the appended claims to cover all modifications which fall within the true spirit and scope of my invention.

What I claim is:

1. An electric heating system comprising a heating element adapted to support a cooking utensil or the like, first temperature responsive means associated with said heating element and adapted to sense the temperature of a utensil resting thereon, second temperature responsive means in heat transfer relation with said heating element, each of said temperature responsive means including a chamber enclosing an expansible fluid, and pressure actuated thermostatic means responsive to said first and second temperature responsive mean for controlling the energization of said heating element.

2. An electric heating system comprising a surface heating unit including a heating element encircling a central area and adapted to support a cooking utensil, first temperature responsive means located within said central area and adapted to sense the temperature of the utensil, second temperature responsive means in heat transfer relation with said heating element, each of said temperature responsive means including a chamber enclosing an expansible fluid, and pressure actuated thermostatic means responsive to said first and second temperature responsive means for controlling the energization of said heating element.

3. An electric heating system comprising a heating element encircling a central area and adapted to support a cooking utensil, a hollow fluid-filled temperature sensing member mounted within said central area and adapted to contact the bottom of a cooking utensil supported on said heating element, a wall member forming an annular fluid filled chamber underlying said heating element and in heat transfer relation therewith, and thermostatic means responsive to the pressures in said hollow member and in said annular chamber for controlling the energization of said heating element.

4. An electric heating system in accordance with claim 3 in which said thermostatic means includes a pair of contacts connected in circuit with said heating element so as to control its energization, and a pair of expansible chambers hydraulically connected to said temperature sensing member and to said annular chamber respectively and arranged to open and close said contacts.

5. An electric heating system in accordance with claim 3 in which said thermostatic means includes a pair of contacts in circuit with said heating element so as to control its energization, a first expansible chamber hydraulically connected to said annular chamber and having a movable wall arranged to actuate said contacts, and a second expansible chamber hydraulically connected to said temperature sensing member, said second expansible chamber being mounted within said first expansible chamber and connected to said movable wall so as to apply a modifying force tending to cause opening of said contacts as the temperature in said temperature sensing member increases.

6. An electric heating unit comprising a heating element adapted to support a cooking utensil or the like, first temperature responsive means associated with said heating element and adapted to sense the temperature of a utensil resting thereon, and second temperature responsive means in heat transfer relation with said heating element, each of said temperature responsive means including a chamber enclosing an expansible fluid, whereby the energization of said heating element may be regulated in accordance with the pressures therein.

7. An electric heating unit comprising a heating element encircling a central area and adapted to support a cooking utensil, a hollow fluid-filled temperature sensing member mounted within said central area and adapted to contact the bottom of a cooking utensil supported on said heating element, and temperature responsive means including a chamber enclosing an expansible fluid in heat transfer relation with said heating element, whereby the energization of said heating element may be controlled in accordance with the pressures in said hollow member and in said chamber.

8. An electric heating unit comprising a generally flat circular metal base plate, a sheathed heating element coiled in at spiral form secured to said plate, a circular metal top plate overlying said base plate and peripherally bonded thereto, said top plate being formed so as to include an annular portion in contact with the top surface of said heating element and a central raised portion enclosing a first fluid-filled chamber adapted to contact the bottom of a utensil resting on said annular portion, and a circular metal bottom plate peripherally bonded to said base plate and formed so as to include an annular depressed portion enclosing a second fluid-filled chamber, whereby the energization of said heating unit may be controlled in accordance with changes in both utensil temperature and the temperature of said heating element.

References Cited in the file of this patent

UNITED STATES PATENTS 2,288,510   Brannon et al. _____ June 30, 1942